United States Patent
Yang et al.

(10) Patent No.: US 11,636,584 B2
(45) Date of Patent: Apr. 25, 2023

(54) REAL-TIME TRACEABILITY METHOD OF WIDTH OF DEFECT BASED ON DIVIDE-AND-CONQUER

(71) Applicant: ZHEJIANG UNIVERSITY, Zhejiang (CN)

(72) Inventors: Yongying Yang, Zhejiang (CN); Weimin Lou, Zhejiang (CN); Fanyi Wang, Zhejiang (CN); Yubin Du, Zhejiang (CN); Pan Guo, Zhejiang (CN); Shiwei Chen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 249 days.

(21) Appl. No.: 17/266,091

(22) PCT Filed: Aug. 2, 2019

(86) PCT No.: PCT/CN2019/099008
§ 371 (c)(1),
(2) Date: Feb. 4, 2021

(87) PCT Pub. No.: WO2020/248345
PCT Pub. Date: Dec. 17, 2020

(65) Prior Publication Data
US 2021/0312609 A1   Oct. 7, 2021

(30) Foreign Application Priority Data

Jun. 14, 2019 (CN) .......................... 201910516180.1

(51) Int. Cl.
*G06T 7/136* (2017.01)
*G01N 21/88* (2006.01)
(Continued)

(52) U.S. Cl.
CPC ....... *G06T 7/0006* (2013.01); *G01N 21/8851* (2013.01); *G06T 7/136* (2017.01);
(Continued)

(58) Field of Classification Search
CPC ......... G06T 7/0006; G06T 7/136; G06T 7/60; G06T 2207/10056; G06T 2207/20012;
(Continued)

(56) References Cited

U.S. PATENT DOCUMENTS

2016/0012579 A1* 1/2016 Shi .......................... G06T 7/001
382/149
2019/0303717 A1* 10/2019 Bhaskar ............... G06K 9/6262

* cited by examiner

*Primary Examiner* — Sheela C Chawan

(57) ABSTRACT

In a real-time traceability method of a width of a defect based on divide-and-conquer provided by the present invention, through the calibration transfer function, the multidimensional eigenvector analysis technology based on the electromagnetic field simulation database of defect scattered dark-field imaging and the adaptive threshold segmentation method, the real-time traceability of the width of the defect greater than and close to the diffraction limit of the system is performed, respectively. The extreme random tree regression model is trained by multidimensional eigenvector analysis technology based on the multidimensional eigenvectors in the electromagnetic field simulation database of the defect scattered dark-field imaging. The present invention solves the problems that the width of the defect in defect detection is difficult to be accurately measured in real time, and the conventional image processing algorithm is difficult to accurately identify the width of the defect close to the diffraction limit of the system.

7 Claims, 5 Drawing Sheets

(51) Int. Cl.
*G06T 7/60* (2017.01)
*G06T 7/00* (2017.01)
(52) U.S. Cl.
CPC ........ *G06T 7/60* (2013.01); *G01N 2021/8887* (2013.01); *G06T 2207/10056* (2013.01); *G06T 2207/20012* (2013.01); *G06T 2207/30164* (2013.01)
(58) Field of Classification Search
CPC ... G06T 2207/30164; G06T 7/11; G06T 7/62; G01N 21/8851; G01N 2021/8887; G01N 21/00
USPC ....... 382/100, 149, 151, 168, 172, 181, 190, 382/305
See application file for complete search history.

REAL-TIME TRACEABILITY METHOD OF WIDTH OF DEFECT BASED ON DIVIDE-AND-CONQUER

CROSS REFERENCE OF RELATED APPLICATION

This is a U.S. National Stage under 35 U.S.C 371 of the International Application PCT/CN2019/099008, filed Aug. 2, 2019, which claims priority under 35 U.S.C. 119(a-d) to CN 201910516180.1, filed Jun. 14, 2019.

BACKGROUND OF THE PRESENT INVENTION

Field of Invention

The present invention relates to the field of machine vision inspection technology, and more particularly to a real-time traceability method of a width of a defect based on divide-and-conquer.

Description of Related Arts

With the advancement of industrial automation manufacturing and international high-precision technology research, more and more stringent requirements are put forward for the surface quality of precision components. Especially in the field of high-energy laser systems, the existence of defects on the surface of smooth glass elements may cause the elements to burst and cause the system to fail to operate. Among the defects, the surface defects of large-diameter components, due to the small size and random distribution relative to the component diameter, are the difficulty of surface quality control. A very important evaluation index for defects is the width of the defect. In order to overcome the problems of low efficiency, strong subjectivity, and ambiguity in traditional manual visual inspection, combining machine vision inspection technology and pattern recognition technology, using scattered dark-field imaging technology to obtain digital images of micron-level defects on the surface of large-diameter components; aiming at the problem that it is difficult for conventional image processing algorithms to accurately measure the width of the defect in real time, the calibration transfer function is used to trace the width of the defect in real time; aiming at the problem that the calibration transfer function is difficult to accurately trace the width of the defect when the width of the defect is close to the diffraction limit of the system, the multidimensional eigenvector in the electromagnetic field simulation database of the defect scattered dark-field imaging is used as the data basis, the width of the defect which is close to the diffraction limit is traced through training an extreme random tree regression model; for defects with a smaller width, an adaptive threshold segmentation algorithm is used for traceability. Combining the above three situations, a real-time traceability method of a width of a defect based on divide-and-conquer with excellent portability is proposed to objectively detect and evaluate the width of the defect.

SUMMARY OF THE PRESENT INVENTION

An object of the present invention is to overcome the shortcomings of the prior art and provide a real-time traceability method of a width of a defect in the microscopic scattered dark-field imaging detection environment, so as to improve the recognition accuracy of the width of the defect.

To solve the above technical problem, the present invention provides a technical solution as follows.

A real-time traceability method of a width of a defect based on divide-and-conquer comprises steps of:

(1) estimating the width of the defect through a calibration transfer function (CTF) based on standard defect digital calibration technology, recording the width of the defect estimated through the CTF as $W_{CTF}$, wherein if $W_{CTF}$ is greater than 5 μm, which means that the width of the defect complies with geometric imaging law and is located in a linear segment of the CTF, then $W_{CTF}$ acts as an accurately estimated value of an actual width of the defect; if $W_{CTF}$ is less than or equal to 5 μm, which means that the width of the defect is smaller, diffraction broadening occurs during imaging, the width of the defect no longer complies with the geometric imaging law, and $W_{CTF}$ acting as the estimated value of the actual width of the defect has a large error, then at this time, a step of (2) is executed;

(2) estimating the width of the defect through a multidimensional eigenvector analysis technology based on an electromagnetic field simulation database of defect scattered dark-field imaging, recording the width of the defect estimated through the multidimensional eigenvector analysis technology as a regression width $W_{regrs}$, wherein if $W_{regrs}$ is greater than a diffraction limit $\sigma_0$ of a dark-field imaging system, then the regression width $W_{regrs}$ acts as the accurately estimated value of the actual width of the defect; if $W_{regrs}$ is less than or equal to the diffraction limit $\sigma_0$, the regression width $W_{regrs}$ is unable to distinguish different widths in a width range, that is, less than or equal to the diffraction limit $\sigma_0$, then at this time, a step of (3) is executed; and (3) processing a dark-field image and extracting the width of the defect through an adaptive threshold segmentation method, recording the width of the defect extracted through the adaptive threshold segmentation method as an imaging width $W_{img}$, wherein if the imaging width $W_{img}$ is greater than the diffraction limit $\sigma_0$, the imaging width $W_{img}$ is unable to distinguish different widths, then the regression width $W_{regrs}$ still acts as the estimated value of the actual width of the defect; if the imaging width $W_{img}$ is less than or equal to the diffraction limit co, then the imaging width $W_{img}$ acts as the estimated value of the actual width of the defect.

In the step of (1), the width of the defect is estimated through the CTF based on the standard defect digital calibration technology, and the CTF for describing a relationship between the actual width of the defect and a pixel width of the defect after imaging is obtained through steps of:

(1-1) according to a principle of binary optics, etching a standard defect on a fused silica glass substrate through electron beam exposure and ion beam etching technology, and obtaining a standard plate;

(1-2) measuring an actual width of the standard defect on the standard plate with a scanning electron microscope (SEM);

(1-3) collecting a dark-field image of the standard defect on the standard plate with a dark-field imaging system;

(1-4) performing a series of processing such as threshold segmentation and morphological operations on the dark-field image, and obtaining a pixel width of the standard defect; and (1-5) taking the pixel width of the standard defect as an independent variable, and the actual width of the standard defect measured by the SEM as a dependent variable, and fitting the independent variable and the dependent variable through a least square method, so as to obtain an object-image correlation function which is the calibration transfer function.

From the object-image relationship of geometric optics, it is able to be seen that the pixel width of the defect has a linear relationship with the actual width of the defect. Therefore, the width traceability of most defects is able to be achieved through the CTF. However, with the decrease of the width of the defect, when the width of the defect approaches the diffraction limit of the dark-field imaging system, geometric optical imaging theory is no longer applicable at this time, fine defects will cause diffraction effects, the pixel width will be increased, which will cause while using the CTF for width traceability, a same pixel width corresponds to more than one actual width, so that it is confused and unable to accurately obtain the actual width. Experiments have found that when the width of the defect is less than or equal to 5 µm, the CTF no longer satisfies the linear relationship, and the width traceability is confused. Therefore, the traceability of the width which is less than or equal to 5 µm is processed through the steps of (2) and (3).

In the step of (2), through the multidimensional eigenvector analysis technology based on the electromagnetic field simulation database of defect scattered dark-field imaging, the regression width $W_{regrs}$ is obtained, which specifically comprises:

(2-1) building the electromagnetic field simulation database of defect scattered dark-field imaging, and obtaining simulation data of scattered light intensity distribution of multiple defects;

(2-2) collecting a dark-field image of a defect to be tested with the dark-field imaging system, obtaining a gray distribution along a width direction of the standard defect on the standard plate, and obtaining experimental data of the gray distribution of an ideal imaging system after deconvolution;

(2-3) performing coordinate system unity and Min-Max normalization on the simulation data obtained by the step of (2-1) and the experimental data obtained by the step of (2-2), and obtaining normalized simulation data of scattered light intensity distribution and normalized experimental data of the gray distribution, wherein the step of (2-3) specifically comprises:

(2-3-1) taking a physical size x as an abscissa for the simulation data obtained by the step of (2-1) and a pixel p as an abscissa for the experimental data obtained by the step of (2-2), unifying the simulation data obtained by the step of (2-1) and the experimental data obtained by the step of (2-2) to take the physical size x as the abscissa through formulas of $$p = \frac{Mx}{S_p}, \quad (I)$$

$$f_{res}(p) \xrightarrow{p=Mx/s_p} f_{res}(x), \quad (II)$$

here, a pixel size of a charge-coupled device (CCD) of the dark-field imaging system is expressed by $S_p$, a magnification of the dark-field imaging system is expressed by A; and (2-3-2) performing Min-Max normalization on the simulation data obtained by the step of (2-1) and the experimental data obtained by the step of (2-2) by a formula of $$\begin{cases} I_{norm}(x) = \frac{I_{sct}(x) - \min\{I_{sct}(x)\}}{\max\{I_{sct}(x)\} - \min\{I_{sct}(x)\}} \\ f_{norm}(x) = \frac{f_{res}(x) - \min\{f_{res}(x)\}}{\max\{f_{res}(x)\} - \min\{f_{res}(x)\}} \end{cases} ; \quad (III)$$

(2-4) respectively extracting multidimensional eigenvectors of the normalized simulation data of the scattered light intensity distribution and multidimensional eigenvectors of the normalized experimental data of the gray distribution;

(2-5) taking the multidimensional eigenvectors of the normalized simulation data of the scattered light intensity distribution in the step of (2-4) as a sample set, training through an extreme random tree regression algorithm with supervised learning in machine learning theory, and obtaining a regression model of a width of any defect; and (2-6) taking the multidimensional eigenvectors of the normalized experimental data of the gray distribution in the step of (2-4) as a test set, inputting the regression model obtained by the step of (2-5), estimating the width of the defect to be tested, and obtaining the regression width $W_{regrs}$ of the defect to be tested.

In the step of (2-1), building the electromagnetic field simulation database of defect scattered dark-field imaging, and obtaining simulation data of scattered light intensity distribution of multiple defects are specifically as follows:

(2-1-1) building an electromagnetic field simulation model of defect scattered dark-field imaging with FDTD (finite-difference time-domain) simulation software;

(2-1-2) building a simulation model of common defects;

(2-1-3) performing numerical calculations of electromagnetic fields with the FDTD simulation software, and obtaining the scattered light intensity distribution of the common defects;

(2-1-4) performing near field—far field projection, obtaining light intensity distribution of the common defects on a far-field image plane of an ideal optical imaging system, and recording as $I_{sct}(x)$; and (2-1-5) changing a defect shape and a defect size, continuously repeating the steps of (2-1-3) to (2-1-4), obtaining the scattered light intensity distribution of the defects with different shapes and sizes, obtaining a series of simulation data, wherein the series of simulation data comprise the shape of the defects, the width of the defects and the light intensity distribution $I_{sct}(x)$ of the defects, so as to form the simulation data of the scattered light intensity distribution of the defects.

In the step of (2-2), collecting the dark-field image of the defect to be tested with the dark-field imaging system, obtaining a gray distribution along a width direction of the standard defect on the standard plate, and obtaining experimental data of the gray distribution of an ideal imaging system after deconvolution are specifically as follows.

(2-2-1) collecting the dark-field image of the defect to be tested with the dark-field imaging system, and extracting the gray distribution $f_{exp}(p)$ along the width direction of the dark-field image of the defect to be tested;

(2-2-2) measuring a point spread function (PSF) of the dark-field imaging system through a checkerboard diagram, wherein since a PSF of an actual optical system tends to a form of Gaussian function, an expression of the PSF of the dark-field imaging system is obtained through Gaussian function fitting in a measurement process; and (2-2-3) taking the PSF obtained by the step of (2-2-2) as an initial value, deconvolving the gray distribution $f_{exp}(p)$ obtained by the step of (2-2-1), and obtaining the gray distribution $f_{exp}(p)$ of the ideal imaging system after deconvolution.

The step of (2-2-1) that extracting the gray distribution $f_{exp}(p)$ along the width direction of the dark-field image of the defect to be tested is specifically as follows.

1) performing Otsu threshold segmentation on an original dark-field image, selecting an elongated structural element for opening operations to connect line features of fractures and holes while removing noise, and then extracting long line features which are defect characteristics;

2) performing linear fitting on pixel coordinates $(u_i, v_i)$ of pixels that form the line features through the least square method, and obtaining a straight line expression of av+b=u, wherein both a and h are parameters;

3) obtaining a positive angle γ between the defect and v axis through the parameter a, wherein γ=arctan(a), and rotate the original dark-field image around an upper left corner for −γ, so that the defect is rotated to a vertical direction;

4) calculating a gray histogram of the original dark-field image, wherein a peak value at low gray denotes a gray level of image background, filling a blank area that appears after rotation with the gray of image background, and obtaining a filled image to maintain an image integrity;

5) taking a column average of the filled image as a gray distribution $f_0(p)$ of the defect along the width direction of the defect to be tested, which is unimodal or bimodal, taking a vertical straight line where a peak abscissa $p_0$ of the unimodal distribution is a symmetry axis, assuming that a data width is 2N+1, and intercepting data points between $p_0-N$ and $p_0+N$ as a gray distribution $f_N(p)$:

6) averaging after making the gray distribution $f_N(p)$ axisymmetric, and obtaining an axisymmetric distribution $f_{sym}(p)$ which is expressed by a formula of $$f_{sym}(p) = \frac{1}{2}[f_N(p) + f_N(2p_0 - p)], \ p\epsilon[p_0 - N, p_0 + N], \quad (IV)$$

moving coordinate axes, taking an abscissa of the symmetry axis as a coordinate origin, and obtaining a gray distribution $f_{exp}(p)$ of the dark-field image of the defect along the width direction, which is expressed by a formula of $$f_{exp}(p)=f_{sym}(p-p_0), p\in [-N,N] \quad (V).$$

In the step of (2-4), the multidimensional eigenvectors of the normalized simulation data of the scattered light intensity distribution and the multidimensional eigenvectors of the normalized experimental data of the gray distribution, respectively comprise curved Gaussian pyramid features of the normalized simulation data and those of the normalized experimental data, an extracting method of the multidimensional eigenvectors comprises:

(2-4-1) recording distributed data as $f(n)$, wherein n represents discrete data points, $f_J(n)$ represents $f(n)$ is located at a $J^{th}$ floor of a pyramid;

(2-4-2) recording a curve distribution of a $j^{th}$ floor of the pyramid as $f_j(n)$, performing low-pass Gaussian filtering on $f_j(n)$, and obtaining $f'_j(n)$;

(2-4-3) downsampling $f'_j(n)$ by a factor of 2, and obtaining a curve distribution of a $(j-1)^{th}$ floor of the pyramid, which is able to be regarded as discarding one data point every one data point, that is $$f_{j-1}(n)=f_2(n)=f_j(2n) \quad (VI);$$

(2-4-4) repeating the steps of (2-4-2) and (2-4-3) for P times, wherein j=J, J−1, . . . , J−P+1, and obtaining a P+1 layer Gaussian pyramid; and (2-4-5) connecting data of the P+1 layer Gaussian pyramid with each other in series, and obtaining the multidimensional eigenvectors.

If the regression width $W_{regrs}$ is less than or equal to the diffraction limit $\sigma_0$, the dark-field image of the defect is degraded seriously and the effect after deconvolution is not good. The grayscale distribution within this width range is very close after normalization, and the regression model is unable to distinguish different widths within this width range. Therefore, the width traceability in this width range is performed through the method described in the step of (3).

The step of (3) comprises processing the dark-field image according to adaptive threshold segmentation method, and obtaining the defect imaging width $W_{img}$ which is specifically as follows.

(3-1) performing threshold segmentation on the dark-field image through Otsu algorithm;

(3-2) extracting an area A and a length l of the defect, and obtaining a pixel width $W_p$ of the defect, wherein $w_p=A/l$;

(3-3) through the pixel size $S_p$ of the CCD, and the magnification M of the dark-field imaging system, obtaining a simple imaging width $W'_{img}$ which is expressed by a formula of $$w'_{img} = \frac{S_p}{M} w_p; \quad (VII)$$

(3-4) performing linear fitting on the simple imaging width $W'_{img}$ below the diffraction limit $\sigma_0$ and the actual width of the defect, obtaining a correlation function therebetween, and correcting a deviation of the defect imaging width according to the correlation function, so as to obtain the defect imaging width $W_{img}$.

Beneficial effects of the present invention are as follows.

The present invention proposes a real-time traceability method of a width of a defect based on divide-and-conquer, which solves the problems that the width is difficult to be measured in real time in the defect detection process and the width of the defect close to the diffraction limit of the system is difficult to be detected. This method integrates the CTF, the extreme random tree regression model based on the multidimensional eigenvectors in the electromagnetic field simulation database of the defect scattered dark-field imaging, and the adaptive threshold segmentation algorithm to trace the width of the defect in real time. According to the method provided by the present invention, the mean square deviation of width recognition is better than 0.3 μm. The method provided by the present invention is able to not only be applied to other systems, but also construct the electromagnetic field simulation database of the defect scattered dark-field imaging which is easily combined with the future Internet of Things and big data analysis, which is conducive to promoting the development of defect detection technology in the direction of intelligence and service.

DETAILED DESCRIPTION OF THE PREFERRED EMBODIMENT

The present invention is further described with accompanying drawings and specific embodiments in detail as follows.

Figure 1:
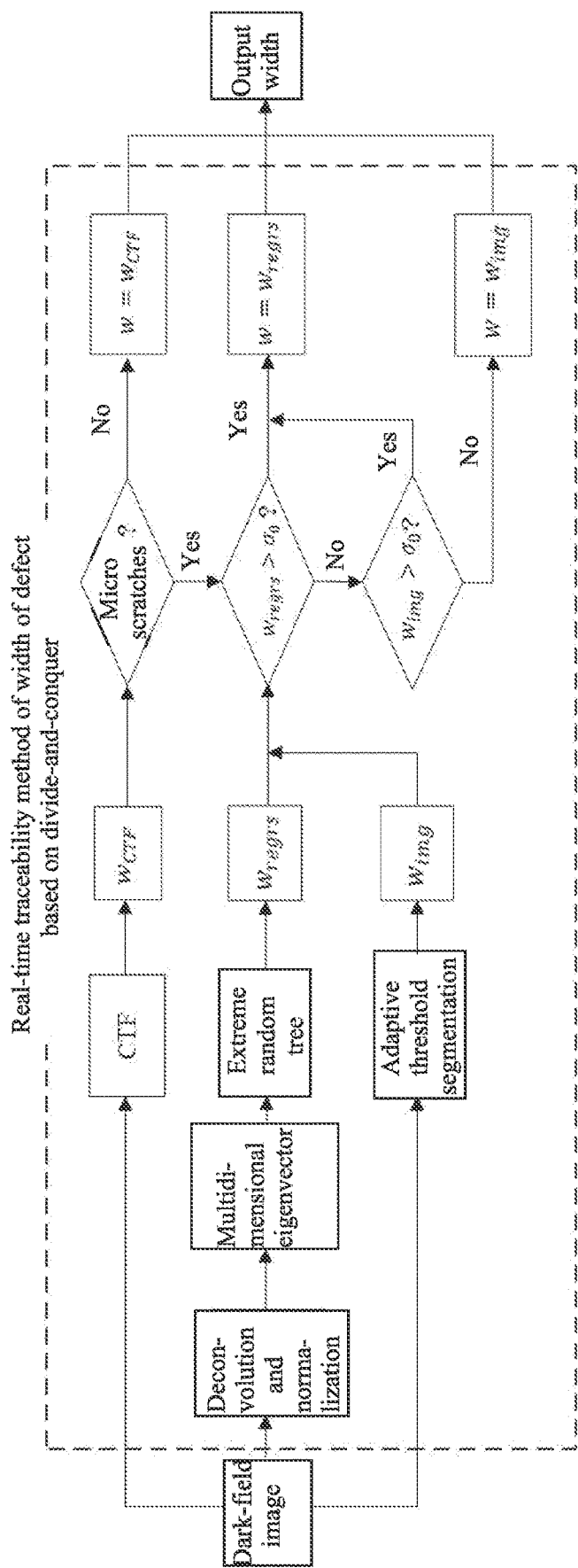
FIG. 1 is a general flow chart of a method provided by the present invention.

According to FIG. 1 of the drawings, a real-time traceability method of a width of a defect based on divide-and-conquer is illustrated, which comprises steps of.

Figure 2A:
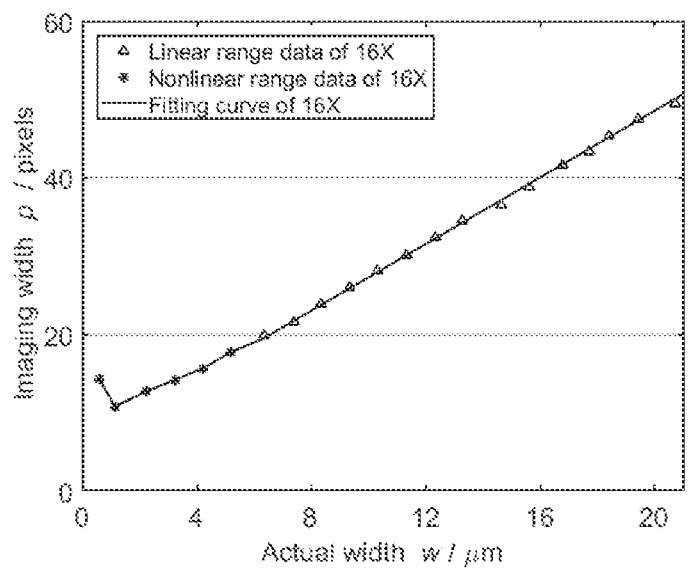
FIG. 2(a) shows a calibration transfer function at a magnification of 16 times.
Figure 2B:
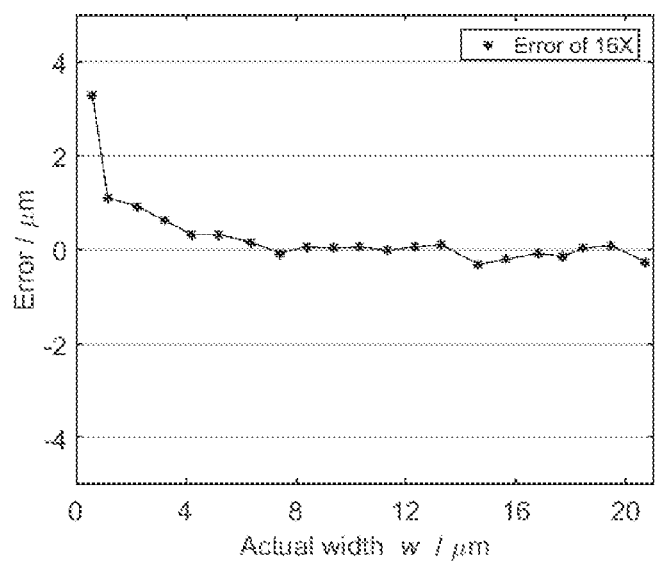
FIG. 2(b) shows a calibration error curve at a magnification of 16 times.
Figure 3:
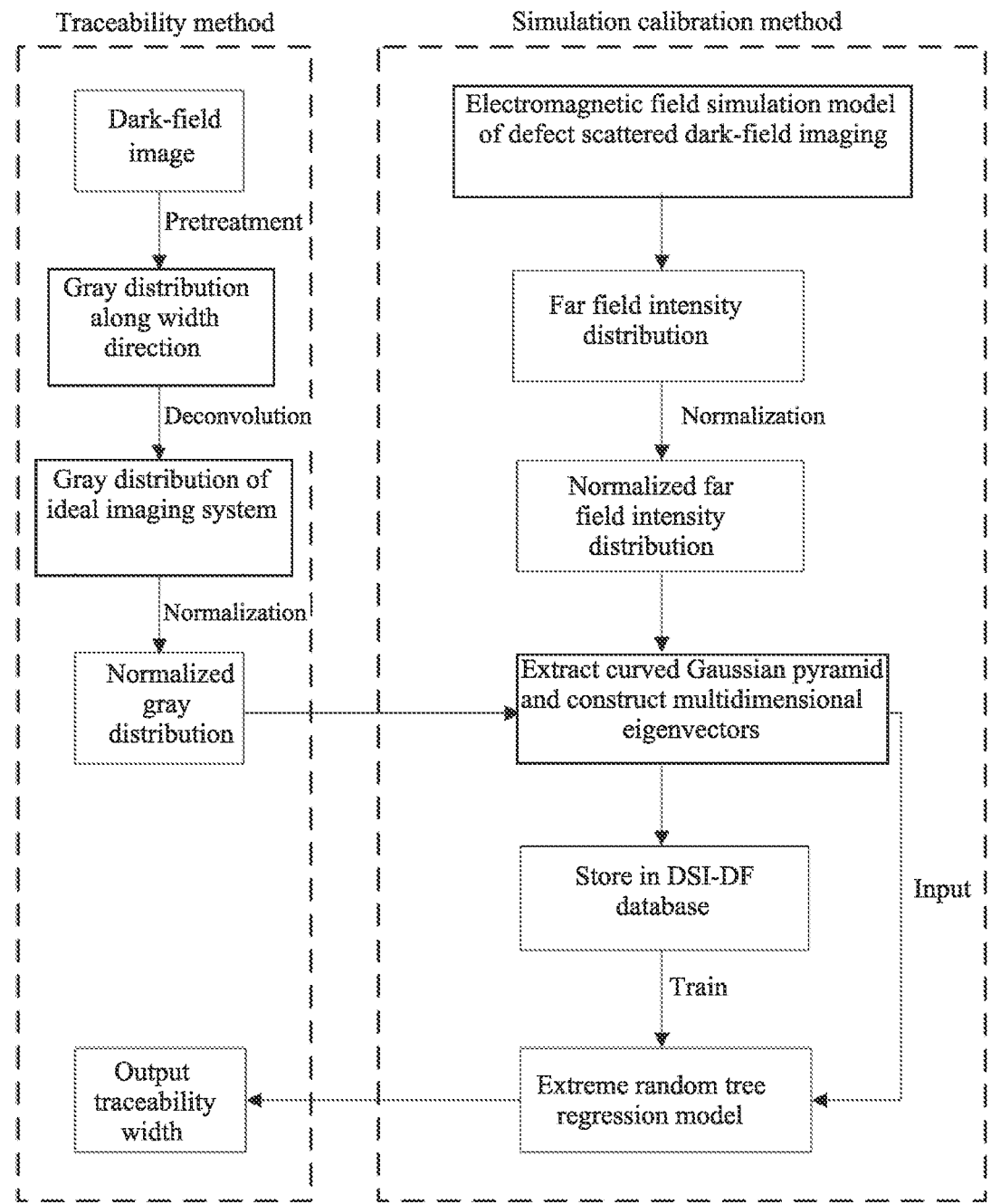
FIG. 3 is a flow chart of multidimensional eigenvector analysis technology based on the electromagnetic field simulation database of defect scattered dark-field imaging.

(1) estimating the width of the defect through a calibration transfer function (CTF) based on standard defect digital calibration technology, and executing a step of (2) if the width of the defect is less than 5 µm, wherein the calibration transfer function is obtained through steps of:

(1-1) according to a principle of binary optics, etching a standard defect on a fused silica glass substrate through electron beam exposure and ion beam etching technology, and obtaining a standard plate;

(1-2) measuring an actual width of the standard defect on the standard plate with a scanning electron microscope (SEM);

(1-3) collecting a dark-field image of the standard defect on the standard plate with a dark-field imaging system;

(1-4) performing a series of processing such as threshold segmentation and morphological operations on the dark-field image, and obtaining a pixel width of the standard defect; and (1-5) taking the pixel width of the standard defect as an independent variable, and the actual width of the standard defect measured by the SEM as a dependent variable, and fitting the independent variable and the dependent variable through a least square method, so as to obtain an object-image correlation function which is the calibration transfer function, wherein FIG. 2(a) shows a calibration transfer function at a magnification of 16 times; it is able to be seen that the calibration transfer function has a good linear law in a width range above 5 µm, and shows a nonlinear law in a width range below 5 µm; a same pixel width corresponds to multiple actual widths, leading to indistinguishable from each other;

(2) estimating the width of the defect through a multidimensional eigenvector analysis technology based on an electromagnetic field simulation database of defect scattered dark-field imaging, as shown in FIG. 3, and executing a step of (3) if the width of the defect is less than a diffraction limit of the system, wherein a regression width of the defect is obtained through steps of:

(2-1) building the electromagnetic field simulation database of defect scattered dark-field imaging, and obtaining simulation data of scattered light intensity distribution of multiple defects;

(2-2) collecting a dark-field image of a defect to be tested with the dark-field imaging system, obtaining a gray distribution along a width direction of the standard defect on the standard plate, and obtaining experimental data of the gray distribution of an ideal imaging system after deconvolution;

(2-3) performing coordinate system unity and Min-Max normalization on the simulation data obtained by the step of (2-1) and the experimental data obtained by the step of (2-2), and obtaining normalized simulation data of scattered light intensity distribution and normalized experimental data of the gray distribution, wherein the step of (2-3) specifically comprises:

(2-3-1) taking a physical size x as an abscissa for the simulation data obtained by the step of (2-1) and a pixel p as an abscissa for the experimental data obtained by the step of (2-2), unifying the simulation data obtained by the step of (2-1) and the experimental data obtained by the step of (2-2) to take the physical size x as the abscissa through formulas of $$p = \frac{Mx}{s_p}, \quad (I)$$

$$f_{res}(p) \xrightarrow{p=Mx/s_p} f_{res}(x), \quad (II)$$

here, a pixel size of a charge-coupled device (CCD) of the dark-field imaging system is expressed by Sp, a magnification of the dark-field imaging system is expressed by M; and (2-3-2) performing Min-Max normalization on the simulation data obtained by the step of (2-1) and the experimental data obtained by the step of (2-2) by a formula of $$\begin{cases} I_{norm}(x) = \frac{I_{sct}(x) - \min\{I_{sct}(x)\}}{\max\{I_{sct}(x)\} - \min\{I_{sct}(x)\}} \\ f_{norm}(x) = \frac{f_{res}(x) - \min\{f_{res}(x)\}}{\max\{f_{res}(x)\} - \min\{f_{res}(x)\}} \end{cases} ; \quad (III)$$

Figure 4:
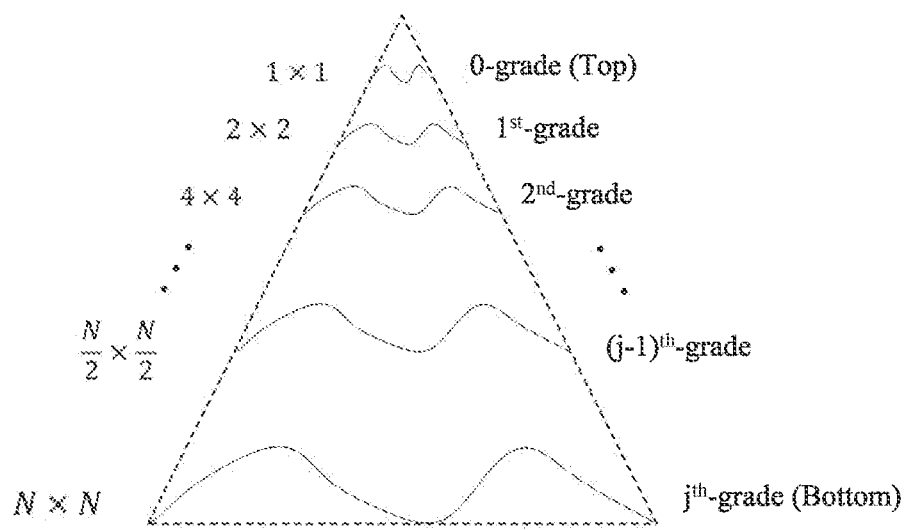
FIG. 4 is a schematic diagram of a curved Gaussian pyramid.

(2-4) respectively extracting a multidimensional eigenvector of the normalized simulation data of the scattered light intensity distribution and a multidimensional eigenvector of the normalized experimental data of the gray distribution, both of which respectively comprise curved Gaussian pyramid features of the normalized simulation data and those of the normalized experimental data, wherein as shown in FIG. 4, the curved Gaussian pyramid is a series of curve data collections arranged in a pyramid shape, is derived from the same curve but with decreasing resolution, and is able to realize multi-scale representation of data; the higher the pyramid, the lower the resolution and size of the curve; the sampling points of the upper curve are half of the lower curve; an extracting method of the curved Gaussian pyramid comprises:

(2-4-1) recording distributed data as $f(n)$, wherein n represents discrete data points, $f_J(n)$ represents $f(n)$ is located at a $J^{th}$ floor of a pyramid;

(2-4-2) recording a curve distribution of a $j^{th}$ floor of the pyramid as $f_j(n)$, performing low-pass Gaussian filtering on $f_j(n)$, and obtaining $f'_j(n)$;

(2-4-3) downsampling $f'_j(n)$ by a factor of 2, and obtaining a curve distribution of a $(j-1)^{th}$ floor of the pyramid, which is able to be regarded as discarding one data point every one data point, that is $$f_{j-1}(n)=f_2(n)=f_j(2n) \qquad \text{(IV)};$$

(2-4-4) repeating the steps of (2-4-2) and (2-4-3) for P times, wherein j=J, J−1, . . . , J−P+1, and obtaining a P+1 layer Gaussian pyramid; and (2-4-5) connecting data of the P+1 layer Gaussian pyramid with each other in series, and obtaining the multidimensional eigenvectors;

(2-5) taking the multidimensional eigenvectors of the normalized simulation data of the scattered light intensity distribution in the step of (2-4) as a sample set, training through an extreme random tree regression algorithm with supervised learning in machine learning theory, and obtaining a regression model of a width of any defect; and (2-6) taking the multidimensional eigenvectors of the normalized experimental data of the gray distribution in the step of (2-4) as a test set, inputting the regression model obtained by the step of (2-5), estimating the width of the defect to be tested, and obtaining the regression width of the defect to be tested, wherein the step of (2-1) building the electromagnetic field simulation database of defect scattered dark-field imaging, and obtaining simulation data of scattered light intensity distribution of multiple defects are specifically as follows:

(2-1-1) building an electromagnetic field simulation model of defect scattered dark-field imaging with FDTD (finite-difference time-domain) simulation software;

(2-1-2) building a simulation model of common defects;

(2-1-3) performing numerical calculations of electromagnetic fields with the FDTD simulation software, and obtaining the scattered light intensity distribution of the defects;

(2-1-4) performing near field—far field projection, obtaining light intensity distribution of the defects on a far-field image plane of an ideal optical imaging system, and recording as $I_{sct}(x)$; and (2-1-5) changing a defect shape and a defect size, continuously repeating the steps of (2-1-3) to (2-1-4), obtaining the scattered light intensity distribution of the defects with different shapes and sizes, obtaining a series of simulation data, wherein the series of simulation data comprise the shape of the defects, the width of the defects and the light intensity distribution $I_{sct}(x)$ of the defects, so as to form the simulation data of the scattered light intensity distribution of the defects.

The step of (2-2) that collecting the dark-field image of the defect to be tested with the dark-field imaging system, obtaining a gray distribution along a width direction of the standard defect on the standard plate, and obtaining experimental data of the gray distribution of an ideal imaging system after deconvolution are specifically as follows:

(2-2-1) collecting the dark-field image of the defect to be tested with the dark-field imaging system, and extracting the gray distribution $f_{exp}(p)$ along the width direction of the dark-field image of the defect to be tested;

(2-2-2) measuring a point spread function (PSF) of the dark-field imaging system through a checkerboard diagram, wherein since a PSF of an actual optical system tends to a form of Gaussian function, an expression of the PSF of the dark-field imaging system is obtained through Gaussian function fitting in a measurement process; and (2-2-3) taking the PSF obtained by the step of (2-2-2) as an initial value, deconvolving the gray distribution $f_{exp}(p)$ obtained by the step of (2-2-1), and obtaining the gray distribution $f_{res}(p)$ of the ideal imaging system after deconvolution.

The step of (2-2-1) that extracting the gray distribution $f_{exp}(p)$ along the width direction of the dark-field image of the defect to be tested is specifically as follows.

1) performing Otsu threshold segmentation on an original dark-field image, selecting an elongated structural element for opening operations to connect line features of fractures and holes while removing noise, and then extracting long line features which are defect characteristics;

2) performing linear fitting on pixel coordinates $(u_i, v_i)$ of pixels that form the line features through the least square method, and obtaining a straight line expression of av+b=u, wherein both a and b are parameters;

3) obtaining a positive angle γ between the defect and v axis through the parameter a, wherein γ=arctan (α), and rotate the original dark-field image around an upper left corner for −γ, so that the defect is rotated to a vertical direction;

4) calculating a gray histogram of the original dark-field image, wherein a peak value at low gray denotes a gray level of image background, filling a blank area that appears after rotation with the gray of image background, and obtaining a filled image to maintain an image integrity;

5) taking a column average of the filled image as a gray distribution $f_0(p)$ of the defect along the width direction, which is unimodal or bimodal, taking a vertical straight line where a peak abscissa $p_0$ of the unimodal distribution is a symmetry axis, assuming that a data width is 2N+1, and intercepting data points between $p_0$−N and $p_0$+N as a gray distribution $f_N(p)$:

6) averaging after making the gray distribution $f_N(p)$ axisymmetric, and obtaining an axisymmetric distribution $f_{sym}(p)$ which is expressed by a formula of $$f_{sym}(p) = \frac{1}{2}[f_N(p) + f_N(2p_0 - p)], \ p \in [p_0 - N, p_0 + N], \qquad \text{(V)}$$

moving coordinate axes, taking an abscissa of the symmetry axis as a coordinate origin, and obtaining a gray distribution $f_{exp}(p)$ of the dark-field image of the defect along the width direction, which is expressed by a formula of $$f_{exp}(p)=f_{sym}(p-p_0), p \in [-N,N] \qquad \text{(VI)}.$$

wherein if the regression width $W_{regrs}$ is less than the diffraction limit of the system, the dark-field image of the defect is severely degraded, an effect after deconvolution is poor; the grayscale distribution in this width range is very close after normalization, the regression model is unable to distinguish different widths in this width range. Therefore, the width traceability in this width range is performed through the method described in the step of (3).

The step of (3) comprises processing the dark-field image according to adaptive threshold segmentation method, and obtaining the defect imaging width $W_{img}$, which is specifically as follows.

(3-1) performing threshold segmentation on the dark-field image through Otsu algorithm;

(3-2) extracting an area A and a length l of the defect, and obtaining a pixel width $W_p$ of the defect, wherein $w_p$=A/l;

(3-3) through the pixel size $S_p$ of the CCD, and the magnification A of the dark-field imaging system, obtaining a simple imaging width $W'_{img}$ which is expressed by a formula of $$w'_{img} = \frac{S_p}{M} w_p; \qquad (VII)$$

and (3-4) performing linear fitting on the simple imaging width $W'_{img}$ below the diffraction limit $\sigma_0$ and the actual width of the defect, obtaining a correlation function therebetween, and correcting a deviation of the defect imaging width according to the correlation function, so as to obtain the defect imaging width $W_{img}$.

First Embodiment

The present invention is able to effectively trace defects whose width is close to the diffraction limit of the dark-field imaging system. Combining the regression width $W_{regrs}$ and the imaging width $W_{img}$, taking the diffraction limit of the dark-field imaging system as the boundary, the dark-field imaging system adopts white light for illumination, has the center wavelength $\lambda$ of 550 nm, the numerical aperture (NA) of 0.15 for high magnification (9.7 times) detection, so that the diffraction limit of the dark-field imaging system at this time is obtained, namely, $$\sigma_0 = \frac{0.5\lambda}{NA} \approx 1.83 \, \mu m.$$

Figure 5A:
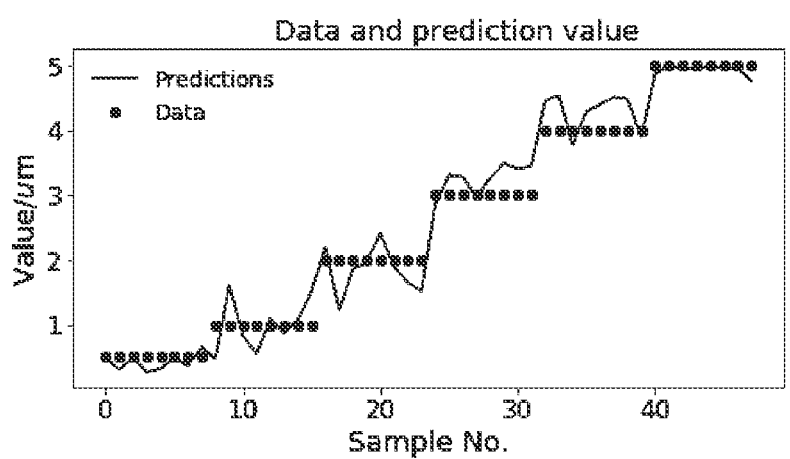
FIG. 5(a) shows the comparison between the traceability width and the actual width at a magnification of 9.7 times.
Figure 5B:
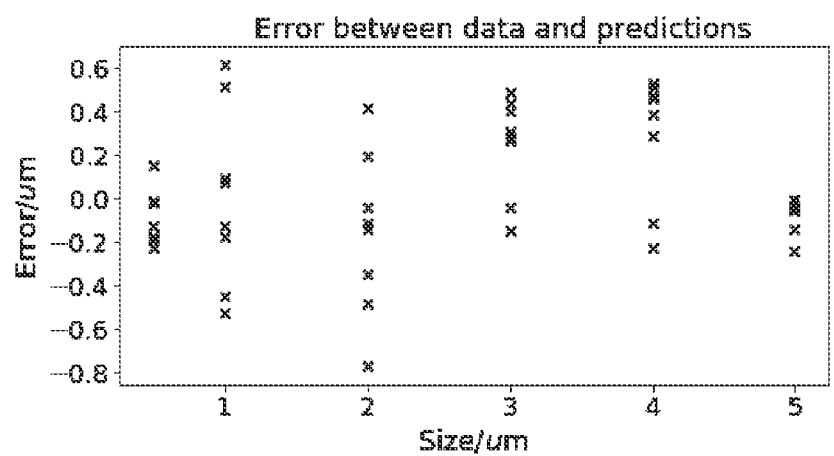
FIG. 5(b) is a schematic diagram of the difference between the traceability width and the actual width at a magnification of 9.7 times.

The traceability method provided by the present invention is used to trace 6 defects with theoretical widths of 0.5, 1, 2, 3, 4 and 5 μm on 8 standard plates with depths of 0.028, 0.053, 0.128, 0.149, 0.205, 0.257, 0.503 and 1.155 μm, respectively, and accordingly, 6×8=48 traceability results of the width of the defect are obtained. FIGS. 5(a) and 5(b) show the results of the real-time traceability method of the width of the defect based on divide-and-conquer. In FIG. 5(a), the abscissa is the sample number, discrete data points represent the actual width, the solid line indicates the traceability width. FIG. 5(b) shows the difference between the traceability width and the actual width is in the range of ±0.8 μm.

Second Embodiment

The present invention is able to effectively trace defects in different dark-field imaging systems, as long as relevant parameters thereof are replaced. The relevant parameters are:

1) the magnification and the pixel size of the CCD, wherein the magnification and the pixel size of the CCD are used in all places where an imaging coordinate system and a pixel coordinate system need to be converted, and the magnification and the pixel size of the CCD need to be replaced during a conversion process;

2) the numerical aperture and the diffraction limit, wherein different detection systems have different numerical apertures (NAs), different diffraction limits $\sigma_0$ are calculated for being replaced while using a decision model library through a formula of $$\sigma_0 = \frac{0.5\lambda}{NA}; \qquad (VIII)$$

here, $\lambda$ is a wavelength of a light source of a corresponding dark-field detection system;

3) the point spread function, wherein different detection systems have different PSFs, which are calibrated again through the checkerboard diagram and do not meet requirements of rapid testing; since the deconvolution does not need to be based on prior PSF knowledge, only an initial estimation of the PSF is required, a PSF calculation method of the other dark-field imaging systems is expressed by a formula of $$h'(p) = \begin{cases} K \exp\left(-\frac{p^2}{2\sigma'^2}\right), & p \in D, \\ 0, & \text{others} \end{cases} \qquad (IX)$$

here $$\sigma' = \frac{\sigma M}{M'},$$

$\sigma$ is a standard error of an original PSF, M is a magnification of an original dark-field imaging system, M' is a magnification of the other dark-field imaging systems, K is a constant.

In the dark-field imaging mode of the OlympusBX51M metallurgical microscope, a 10× objective lens is used, $NA^{Olym}=0.3$, the pixel size of the CCD $s_p^{Olym}=3.45$ μm, and there is a 0.63× imaging lens in front of the CCD. The magnification, the diffraction limit, and the point spread function of the traceability method are replaced as follows:

1) Magnification:

$$M^{Olym}=10\times 0.63=6.3 \qquad (X).$$

2) Diffraction Limit:

$$\sigma_0^{Olym} = \frac{0.5\lambda}{NA^{Olym}} \approx 0.9 \mu m. \qquad (XI)$$

3) Point Spread Function:

$$h^{Olym}(p) = 10.71 \exp\left[-\left(\frac{p}{5.503 \times \frac{9.7}{6.3}}\right)^2\right] = 10.71 \exp\left[-\left(\frac{p}{8.525}\right)^2\right]. \qquad (XII)$$

Figure 6A:
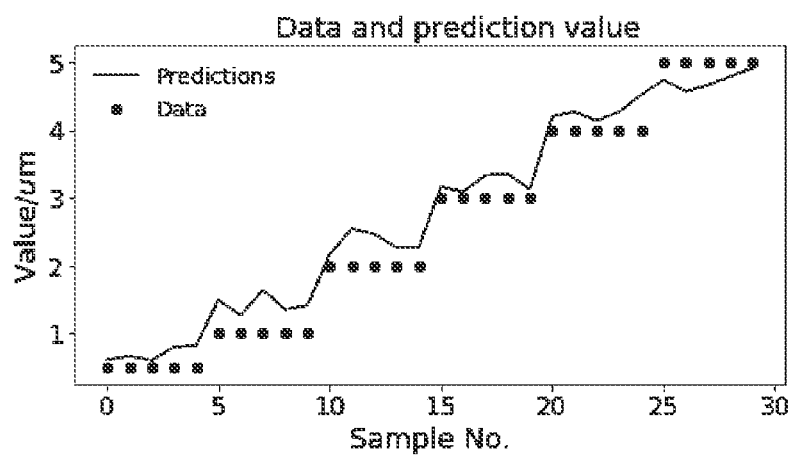
FIG. 6(a) is a comparison diagram of the traceability width and the actual width obtained when the traceability method provided by the present invention is applied to defect dark-field images collected by the Olympus microscope dark-field imaging system.
Figure 6B:
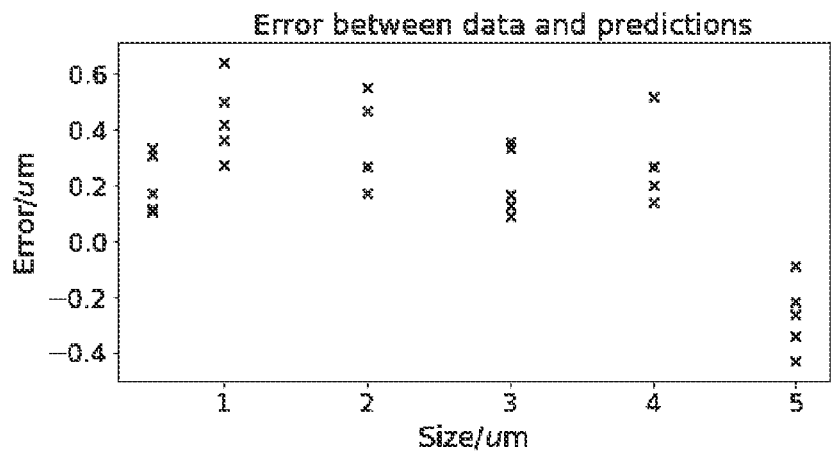
FIG. 6(b) is a schematic diagram of the difference between the traceability width and the actual width obtained when the traceability method provided by the present invention is applied to defect dark-field images collected by the Olympus microscope dark-field imaging system.

The dark-field images of defects with widths of 0.5, 1, 2, 3, 4, and 5 μm on the standard plate with depths of 0.128, 0.149, 0.205, 0.257, 0.503 μm are collected, respectively. The model after parameter replacement is used to identify the widths. FIGS. 6(a) and 6(b) show the results of the real-time traceability method of the width of the defect based on the divide-and-conquer. In FIG. 6(a), the abscissa is the sample number, discrete data points represent the actual width, the solid line indicates the traceability width. FIG. 6(b) shows the difference between the traceability width and the actual width is in the range of +0.65 μm.

What is claimed is:

1. A real-time traceability method of a width of a defect based on divide-and-conquer, the real-time traceability method comprising steps of:
    (1) estimating the width of the defect through a calibration transfer function (CTF) based on standard defect digital calibration technology, recording the width of the defect estimated through the CTF as $W_{CTF}$, wherein if $W_{CTF}$ is greater than 5 μm, which means that the width of the defect complies with geometric imaging law and is located in a linear segment of the CTF, then $W_{CTF}$ acts as an accurately estimated value of an actual width of the defect; if $W_{CTF}$ is less than or equal to 5 μm, which means that the width of the defect is smaller, diffraction broadening occurs during imaging, the width of the defect no longer complies with the geometric imaging law, and $W_{CTF}$ acting as the estimated value of the actual width of the defect has a large error, then at this time, a step of (2) is executed;
    (2) estimating the width of the defect through a multidimensional eigenvector analysis technology based on an electromagnetic field simulation database of defect scattered dark-field imaging; recording the width of the defect estimated through the multidimensional eigenvector analysis technology as a regression width $W_{regrs}$, wherein if $W_{regrs}$ is greater than a diffraction limit $\sigma_0$ of a dark-field imaging system, then the regression width $W_{regrs}$ acts as the accurately estimated value of the actual width of the detect; if $W_{regrs}$ is less than or equal to the diffraction limit $\sigma_0$, the regression width $W_{regrs}$ is unable to distinguish different widths in a width range which is less than or equal to the diffraction limit $\sigma_0$, then at this time, a step of (3) is executed; and
    (3) processing a dark-field image and extracting the width of the defect through an adaptive threshold segmentation method, recording the width of the defect extracted through the adaptive threshold segmentation method as an imaging width $W_{img}$, wherein if the imaging width $W_{img}$ is greater than the diffraction limit $\sigma_0$, the imaging width $W_{img}$ is unable to distinguish different widths, then the regression width $W_{regrs}$ still acts as the estimated value of the actual width of the defect; if the imaging width $W_{img}$ is less than or equal to the diffraction limit $\sigma_0$, then the imaging width $W_{img}$ acts as the estimated value of the actual width of the defect.

2. The real-time traceability method of the width of the defect based on divide-and-conquer according to claim 1, wherein the step of (2) that, through the multidimensional eigenvector analysis technology based on the electromagnetic field simulation database of defect scattered dark-field imaging, the regression width is obtained, specifically comprises:
    (2-1) building the electromagnetic field simulation database of defect scattered dark-field imaging, and obtaining simulation data of scattered light intensity distribution of multiple defects on a far-field CCD (charged-couple device) image surface;
    (2-2) collecting a dark-field image of a defect to be tested with the dark-field imaging system, obtaining a gray distribution along a width direction of the standard defect on the standard plate, and obtaining experimental data of the gray distribution of an ideal imaging system after deconvolution;
    (2-3) performing coordinate system unity and Min-Max normalization on the simulation data obtained by the step of (2-1) and the experimental data Obtained by the step of (2-2), and obtaining normalized simulation data of scattered light intensity distribution and normalized experimental data of the gray distribution;
    (2-4) respectively extracting multidimensional eigenvectors of the normalized simulation data of the scattered light intensity distribution and multidimensional eigenvectors of the normalized experimental data of the gray distribution:
    (2-5) taking the multidimensional eigenvectors of the normalized simulation data of the scattered light intensity distribution in the step of (2-4) as a sample set, training through an extreme random tree regression algorithm with supervised learning in machine learning theory, and obtaining a regression model of a width of any defect; and
    (2-6) taking the multidimensional eigenvectors of the normalized experimental data of the gray distribution in the step of (2-4) as a test set, inputting the regression model obtained by the step of (2-5), estimating the width of the defect to be tested, and obtaining the regression width $W_{regrs}$ of the defect to be tested.

3. The real-time traceability method of the width of the defect based on divide-and-conquer according to claim 2, wherein the step of (2-2) that, collecting the dark-field image of the defect to be tested with the dark-field imaging system, obtaining the gray distribution along the width direction of the standard defect on the standard plate, and obtaining experimental data of the gray distribution of the ideal imaging system after deconvolution, specifically comprises:
    (2-2-1) collecting the dark-field image of the defect to be tested with the dark-field imaging system, and extracting the gray distribution $f_{exp}(p)$ along the width direction of the dark-field image of the defect to be tested;
    (2-2-2) measuring a point spread function (PSF) of the dark-field imaging system through a checkerboard diagram, wherein since a PSF of an actual optical system tends to a form of Gaussian function, an expression of the PSF of the dark-field imaging system is Obtained through Gaussian function fitting in a measurement process; and
    (2-2-3) taking the PST Obtained by the step of (2-2-2) as an initial value, deconvolving the gray distribution $f_{exp}(p)$ obtained by the step of (2-2-1), and obtaining the gray distribution $f_{res}(p)$ of the ideal imaging system after deconvolution.

4. The real-time traceability method of the width of the defect based on divide-and-conquer according to claim 3, wherein the step of (2-2-1) that, extracting the gray distribution $f_{exp}(p)$ along the width direction of the dark-field image of the defect to be tested, specifically comprises:
    1) performing Otsu threshold segmentation on an original dark-field image, selecting an elongated structural element for opening operations to connect line features of fractures and holes while removing noise, and then extracting long line features which are defect characteristics;
    2) performing linear fitting on pixel coordinates $(u_i, v_i)$ of pixels that form the line features through the least square method, and obtaining a straight line expression of $av+b=u$, wherein both a and b are parameters;
    3) obtaining a positive angle γ between the defect and v axis through the parameter a, wherein γ=arctan (α), and rotate the original dark-field image around an upper left corner for −γ, so that the defect is rotated to a vertical direction;
    4) calculating a gray histogram of the original dark-field image, wherein a peak value at low gray denotes a gray level of image background, idling a blank area that appears after rotation with the gray of image background, and obtaining a filled image to maintain an image integrity;

5) taking a column average of the filled image as a gray distribution $f_0(p)$ of the detect along the width direction, which is unimodal or bimodal, taking a vertical straight line where a peak abscissa $p_0$ of the unimodal distribution is a symmetry axis, assuming that a data width is 2N+1, and intercepting data points between $p_0-N$ and $p_0+N$ as a gray distribution $f_N(p)$; and 6) averaging after making the gray distribution $f_N(p)$ axisymmetric, and obtaining an axisymmetric distribution $f_{sym}(p)$ which is expressed by a formula of $$f_{sym}(p) = \frac{1}{2}[f_N(p) + f_N(2p_0 - p)], \ p \in [p_0 - N, p_0 + N], \quad \text{(I)}$$

moving coordinate axes, taking an abscissa of the symmetry axis as a coordinate origin, and obtaining a gray distribution $f_{exp}(p)$ of the dark-field image of the defect along the width direction, which is expressed by a formula of $$f_{exp}(p) = f_{sym}(p-p_0), p \in [-N,N] \quad \text{(II)}.$$

5. The real-time traceability method of the width of the defect based on divide-and-conquer according to claim 2, wherein in the step of (2-4), the multidimensional eigenvectors of the normalized simulation data of the scattered light intensity distribution and the multidimensional eigenvectors of the normalized experimental data of the gray distribution, respectively comprise curved Gaussian pyramid features of the normalized simulation data and those of the normalized experimental data, an extracting method of the multidimensional eigenvectors comprises:

(2-4-1) recording distributed data as $f(n)$, wherein n represents discrete data points, $f_J(n)$ represents $f(n)$ is located at a $J_{th}$ floor of a pyramid;

(2-4-2) recording a curve distribution of a $j^{th}$ floor of the pyramid as $f_j(n)$, performing low-pass Gaussian filtering on $f_j(n)$, and obtaining $f'_j(n)$;

(2-4-3) downsampling $f'_j(n)$ by a factor of 2, and obtaining a curve distribution of a $(j-1)^{th}$ floor of the pyramid, which is able to be regarded as discarding one data point every one data point and is expressed by a formula of $$f_{j-1}(n)=f_2(n)=f_j(2n) \quad \text{(III)}$$

(2-4-4) repeating the steps of (2-4-2) and (2-4-3) for P times, wherein j=J, J−1, . . . , J−P+1, and obtaining a P+1 layer Gaussian pyramid; and (2-4-5) connecting data of the P+1 layer Gaussian pyramid with each other in series, and obtaining the multidimensional eigenvectors.

6. The real-time traceability method of the width of the defect based on divide-and-conquer according to claim 5, wherein the step of (3) that, processing the dark-field image according to adaptive threshold segmentation method, and obtaining the defect imaging width $W_{img}$, specifically comprises:

through the pixel size $S_p$ of the CCD, and the magnification M of the dark-field imaging system, obtaining a simple imaging width trim $w'_{img}$ which is expressed by a formula of $$w'_{img} = \frac{S_p}{M} w_p; \quad \text{(IV)}$$

and performing linear fitting on the simple imaging width $W_{img}$ below the diffraction limit $\sigma_0$ and the actual width of the defect, obtaining a correlation function therebetween, and correcting a deviation of the defect imaging width according to the correlation function, so as to obtain the defect imaging width $W_{img}$.

7. The real-time traceability method of the width of the defect based on divide-and-conquer according to claim 6, wherein the present invention has portability for defect detection under other dark-field imaging systems, and only needs to obtain relevant parameters of the other dark-field imaging systems for replacement, which specifically comprises:

obtaining the magnification and the pixel size of the CCD, wherein the magnification and the pixel size of the CCD are used in all places where an imaging coordinate system and a pixel coordinate system need to be converted, and the magnification and the pixel size of the CCD need to be replaced during a conversion process;

obtaining the numerical aperture and calculating the diffraction limit, wherein different detection systems have different numerical apertures (NAs), different diffraction limits $\sigma_0$ are calculated for being replaced while using a decision model library;

calculating the point spread function, wherein different detection systems have different PSFs, which are calibrated again through the checkerboard diagram and do not meet requirements of rapid testing; since the deconvolution does not need to be based on prior PSF knowledge, only an initial estimation of the PSF is required, a PSF calculation method of the other dark-field imaging systems is expressed by a formula of $$h'(p) = \begin{cases} K \exp\left(-\dfrac{p^2}{2\sigma'^2}\right), & p \in D, \\ 0, & \text{others} \end{cases} \quad \text{(V)}$$

here, $$\sigma' = \frac{\sigma M}{M'},$$

$\sigma$ is a standard error of an original PST, M is a magnification of an original dark-field imaging system, M' is a magnification of the other dark-field imaging systems, K is a constant.

* * * * *